(12) United States Patent
Kowalchuk

(10) Patent No.: US 9,451,740 B2
(45) Date of Patent: Sep. 27, 2016

(54) SINGULATION-STYLE SEEDING SYSTEM

(71) Applicant: CNH Canada, Ltd., Saskatoon (CA)

(72) Inventor: Trevor Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 20 days.

(21) Appl. No.: 13/840,909

(22) Filed: Mar. 15, 2013

(65) Prior Publication Data

US 2014/0261115 A1  Sep. 18, 2014

(51) Int. Cl.

| | | |
|---|---|---|
| A01C 7/04 | (2006.01) | |
| A01C 7/08 | (2006.01) | |
| A01C 7/10 | (2006.01) | |
| A01C 15/00 | (2006.01) | |
| A01C 21/00 | (2006.01) | |
| A01B 49/06 | (2006.01) | |
| A01C 7/06 | (2006.01) | |

(52) U.S. Cl.
CPC ............. *A01C 7/046* (2013.01); *A01B 49/06* (2013.01); *A01C 7/06* (2013.01); *A01C 7/082* (2013.01); *A01C 7/102* (2013.01); *A01C 15/006* (2013.01); *A01C 21/002* (2013.01); *Y02P 60/215* (2015.11)

(58) Field of Classification Search
CPC ...... A01C 7/046; A01C 7/044; A01C 7/042; A01C 7/04; A01C 7/00; A01C 7/08; A01C 7/081; A01C 7/082; A01C 7/084; A01C 7/10; A01C 7/102; A01C 7/06; A01C 21/002; A01C 21/00; A01C 15/00; A01C 15/005; A01C 15/006; A01B 49/06; A01B 49/04; A01B 49/00; Y02P 60/215; Y02P 60/00; Y02P 60/10; Y02P 60/20; Y02P 60/21; Y02P 60/212

USPC .................................. 111/170, 174–188
See application file for complete search history.

(56) References Cited

U.S. PATENT DOCUMENTS

| | | | |
|---|---|---|---|
| 5,220,876 A * | 6/1993 | Monson et al. | ............ 111/130 |
| 5,357,884 A | 10/1994 | Bourgault | |
| 6,070,539 A | 6/2000 | Flamme et al. | |
| 6,298,797 B1 | 10/2001 | Hundeby et al. | |
| 6,845,724 B2 | 1/2005 | Mayerle | |
| 6,883,445 B2 | 4/2005 | Mayerle | |
| 7,004,090 B2 | 2/2006 | Swanson | |

(Continued)

FOREIGN PATENT DOCUMENTS

WO  2011056123  5/2011

OTHER PUBLICATIONS

"Yield-Pro Planters", Great Plains Manufacturing, Inc., http://www.greatplainsmfg.com/gpint/products/planters/Yield-Pro_Cat.pdf.

(Continued)

*Primary Examiner* — Christopher J Novosad
(74) *Attorney, Agent, or Firm* — Rebecca L. Henkel

(57) ABSTRACT

A singulation-style seeding system is provided that may include planter row units arranged on a drill that may have a front rank and a back rank. The planter units may singulate and deliver seeds from a first segment of the drill, which may correspond to one of the front and back ranks. A high-volume fertilizer may be delivered from a second segment of the drill, which may correspond to the other one of the front and back ranks and may be delivered at a relatively high delivery rate. A starter fertilizer may be delivered at a relatively lower delivery rate at or near seed furrows.

13 Claims, 4 Drawing Sheets

(56) References Cited

U.S. PATENT DOCUMENTS

| | | |
|---|---|---|
| 7,182,029 B2 | 2/2007 | Horn |
| 7,258,070 B2 | 8/2007 | Mayerle |
| 8,196,534 B2 | 6/2012 | Meyer et al. |
| 8,234,987 B2 | 8/2012 | Georgison et al. |
| 2010/0017073 A1 | 1/2010 | Landphair |
| 2010/0282141 A1 | 11/2010 | Wollenhaupt et al. |
| 2010/0282145 A1* | 11/2010 | Preheim et al. ............... 111/185 |
| 2011/0272939 A1 | 11/2011 | Stettner et al. |
| 2012/0067258 A1 | 3/2012 | Maro |
| 2012/0227649 A1 | 9/2012 | Kowalchuk et al. |
| 2012/0234220 A1 | 9/2012 | Orrenius |
| 2012/0260835 A1 | 10/2012 | Stark |

OTHER PUBLICATIONS

"Features & Benefits", Great Plains Manufacturing, Inc., http://www.greatplainsmfg.com/products/planter/12row.pdf.

* cited by examiner

SINGULATION-STYLE SEEDING SYSTEM

FIELD OF THE INVENTION

The invention relates generally to seeding equipment and, in particular, to pneumatic drills for small grain seeding.

BACKGROUND OF THE INVENTION

Conventional small grain seeding equipment utilizes an air cart to pneumatically transport seeds to ground-engaging openers. This provides a randomized planting of seeds. Some seeds are spaced close together and some are spaced far apart from each other. Some small seeds crops, such as canola, experience relatively high mortality rates, which may approach 50% mortality in overly crowded seed placement conditions in which the seeds are spaced too close together. Attempted singulation style of small seeds crops can prove relatively inefficient because singulation style planters are typically unable to deliver high rates of fertilizer while planting.

SUMMARY OF THE INVENTION

The present invention is directed to a singulation-style seeding system including a pneumatic-style drill frame that incorporates planter row units that can singulate small seeds, such as canola, for individual delivery to an agricultural field and that can be used with an air cart to deliver high volumes of fertilizer during such singulation-style seeding. This may provide better seed placement and more consistent appropriate seed spacing when compared to pneumatic cart and drill equipment and may also allow for delivery of higher volumes of fertilizer at the time of seeding when compared to row crop planting equipment.

According to one aspect of the invention, a singulation-style seeding system is provided that includes a drill having openers on a front rank of the drill for placing high volume fertilizer, such as urea or a high nitrogen fertilizer, and planter row units on a back rank of the drill for singulating and individually delivering seeds to an agricultural field. This may allow for simultaneous consistent seed placement and high volume fertilizer delivery while seeding.

According to another aspect of the invention, the singulation-style seeding system may include a drill towable behind a tractor. The drill may define a first rank arranged relatively closer to the tractor and a second rank arranged relatively further from the tractor. A bulk storage system towable behind the tractor may be provided for storing fertilizer for delivery to the agricultural field and seed for delivery to the agricultural field. A ground-engaging tool may be supported by one of the first and second ranks of the drill and arranged to contact the agricultural field. A fertilizer delivery tube receives the fertilizer from the bulk storage system and may be arranged with respect to the ground-engaging tool for delivering the fertilizer to the agricultural field. A seed meter may be supported by the other one of the first and second ranks of the drill and receive the seed from the bulk storage system for singulating and individually delivering the seed to the agricultural field.

According to another aspect of the invention, the bulk storage system may include a seed storage container for bulk storage of seed that may be supported by the drill. A first fertilizer storage container storing a starter fertilizer may be supported by the drill for delivery to the agricultural field at a first delivery rate. A second fertilizer storage container towable by the tractor may be separate from the drill and store a high-volume fertilizer for delivery to the agricultural field at a second delivery rate that may be greater than the first delivery rate. The starter fertilizer may be delivered at one of the first and second ranks of the drill and the high-volume fertilizer may be delivered at the other one of the first and second ranks of the drill.

According to another aspect of the invention, the bulk storage system may include a first bulk storage container storing the fertilizer and a second bulk storage container storing the seed. At least one of the first and second bulk storage containers may be arranged upon the drill. At least one of the first and second bulk storage containers may be defined by an air cart towable behind the tractor, and the air cart may be towed behind the drill. The air cart may define the first bulk storage container storing a high-volume fertilizer for delivery at a relatively higher delivery rate. The bulk storage system may further include a third bulk storage container arranged upon the drill and may store a starter fertilizer for delivery at a relatively lower delivery rate. The third bulk storage container may be defined by a liquid fertilizer tank storing a liquid starter fertilizer.

According to another aspect of the invention, the seed meter includes a seed disk for conveying individual seeds through the seed meter for individual delivery to the agricultural field and may be arranged at the second rank of the drill. A seed delivery tube may receive seeds from the seed meter and deliver the individual seeds to the agricultural field. The seed tube may be arranged with respect to the opener of the ground-engaging tool to deliver the seed to a location that may be transversely spaced from a fertilizer delivery location.

According to another aspect of the invention, the ground-engaging tools may include openers arranged to open furrows in the agricultural field for receiving the fertilizer. The openers may be a furrow opening points, sweeps, shovels, knives, coulters, or opener disks which may be arranged at the front rank. At the back rank, openers may be arranged at the planter row units and may create seed beds for delivery of the singulated seeds.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
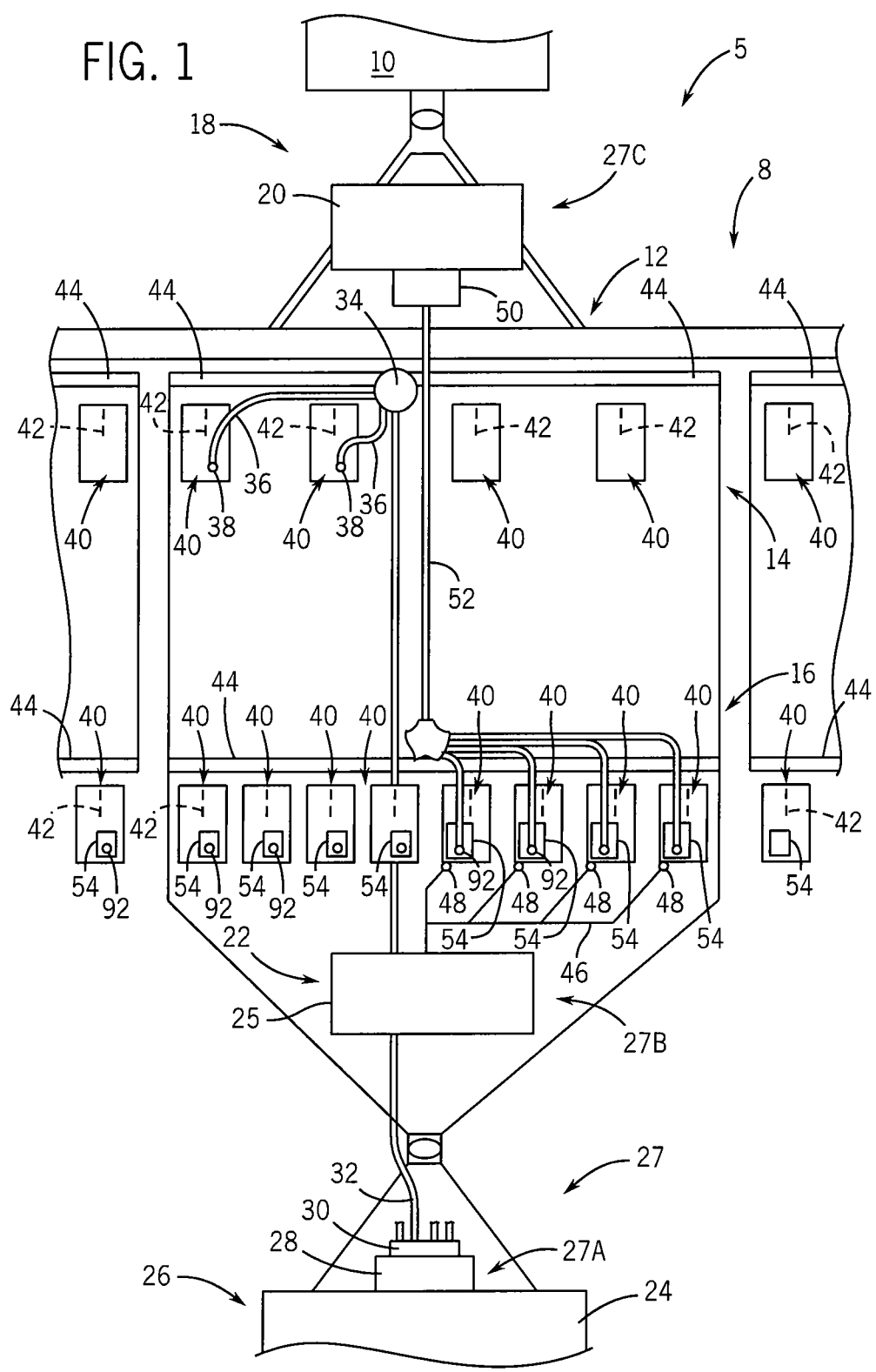
FIG. 1 illustrates a schematic representation of a singulation-style seeding system in accordance with the present invention.

Referring now to the drawings and specifically to FIG. 1, a singulation-style seeding system 5 is schematically shown including a drill 8 that may be a front or rear folding drill or a wing-up folding drill that is towed behind a tractor 10. Drill 8 has a frame 12 that supports multiple ranks shown as a front rank 14 arranged closer to the tractor 10 and a back rank 16 arranged further from the tractor 10. A bulk storage system 18 stores grain which may be small grain such as canola and also stores fertilizer which may be liquid or dry or other granular product for delivery to an agricultural field by way of the system 5, as explained in greater detail elsewhere herein.

Still referring to FIG. 1, bulk storage system 18 includes multiple storage containers. The multiple containers of the bulk storage system 18 may include a first bulk storage container shown as a bulk seed storage container 20, a second bulk storage container shown as defining a first fertilizer storage container 22 which may define a liquid tank 25 for storing a liquid fertilizer, and a third bulk storage container shown as defining a second fertilizer storage container 24. In this embodiment, the bulk seed storage container 20 and the first fertilizer storage container 22 are supported by the frame 12 of the drill 8. The second fertilizer storage container 24 is arranged at an air cart 26 that is towed behind the drill 8, although it is understood that the air cart 26 may instead be arranged between the tractor 10 and the drill 8.

Still referring to FIG. 1, a product distribution system 27 may include a high volume product distribution system 27A, a low volume product distribution system 27B, and a seed distribution system 27C. The product distribution system 27 directs product from the bulk seed storage container 20 and first and/or second fertilizer storage containers 22, 24 to different segments of the drill 8 for delivery to the agricultural field.

Still referring to FIG. 1, within the high volume product distribution system 27A, an airflow(s) from a fan 28 mounted to the air cart 26 is directed through a plenum to a primary distribution manifold 30 that includes individual passages which divide the airflow into separate airflows or airflow segments that are each connected by primary distribution lines 32 that extend toward the drill 8. The primary distribution lines 32 connect to a secondary distribution manifold(s) 34 supported by the drill 8. Secondary distribution lines 36 connect the secondary distribution manifold 34 to individual delivery tubes 38 having outlets for delivering fertilizer at each ground-engaging tool 40 arranged at the front rank 14. It is understood secondary distribution lines 36 extend to delivery tubes 38 at all of the ground engaging tools 40 at the front rank 14, although only shown as extending to some ground engaging tools 40 on the left-hand side for simplifying the schematic representation of the system 5.

Each ground-engaging tool 40 may include an opener 42 supported by a tool bar 44 and which may be a furrow opening point, sweep, shovel, knife, coulter, or opener disk that opens a furrow to receive fertilizer from the delivery tubes 38. This allows for delivery of fertilizer from the air cart 26 at a relatively high delivery rate so as to provide a relatively large volume of fertilizer to the agricultural field, such that the fertilizer defines a high-volume fertilizer, which may be urea or a high nitrogen fertilizer. It is understood that the fertilizer delivered through the high volume product distribution system 27A may instead be delivered to the agricultural field at the back rank 16 instead of or in addition to the front rank 14.

Still referring to FIG. 1, within the low volume product distribution system 27B, the liquid tank 25 of this embodiment stores liquid fertilizer under pressure within the liquid tank 25. The positive pressure within the liquid tank 25 provides a driving force that conveys the liquid fertilizer through delivery lines 46 through delivery tubes 48 at ground-engaging tools 40 supported by a tool bar 44 at the back rank 16 of the drill 8. The low volume product distribution system 27B is arranged to deliver the fertilizer from the liquid tank 25 at a relatively low delivery rate so as to provide a relatively low volume of fertilizer that is delivered at the back rank 16 so that the fertilizer delivered through the low volume product distribution system 27B may a starter fertilizer that may be delivered near seeds during planting. It is understood that delivery lines 46 extend to delivery tubes 48 at all of the ground engaging tools 40 at the back rank 16, although only shown as extending to some ground engaging tools 40 on the right-hand side for simplifying the schematic representation of the system 5. It is also understood that the fertilizer delivered through the low volume product distribution system 27B may instead be delivered to the agricultural field at the front rank 14 instead of or in addition to the back rank 16.

Still referring to FIG. 1, within the seed distribution system 27C, a fan 50 mounted to the drill 8 pneumatically directs seed from the bulk seed storage container 20 through a seed conduit(s) 52 to seed singulating arrangements shown as seed meters 54 arranged at the back rank 16. It is understood that seed conduit(s) 52 extend to all of the seed meters 54, although only shown as extending to some seed meters 54 on the right-hand side for simplifying the schematic representation of the system 5. The seed meters 54 may be arranged with respect to the ground-engaging tools 40 at the back rank 16 so that the seeds from the seed meters 54 may be delivered into furrows formed by the respective ground engaging tools 40. It is understood that the seed meters 54 may instead be arranged at the front rank 14.

Figure 2:
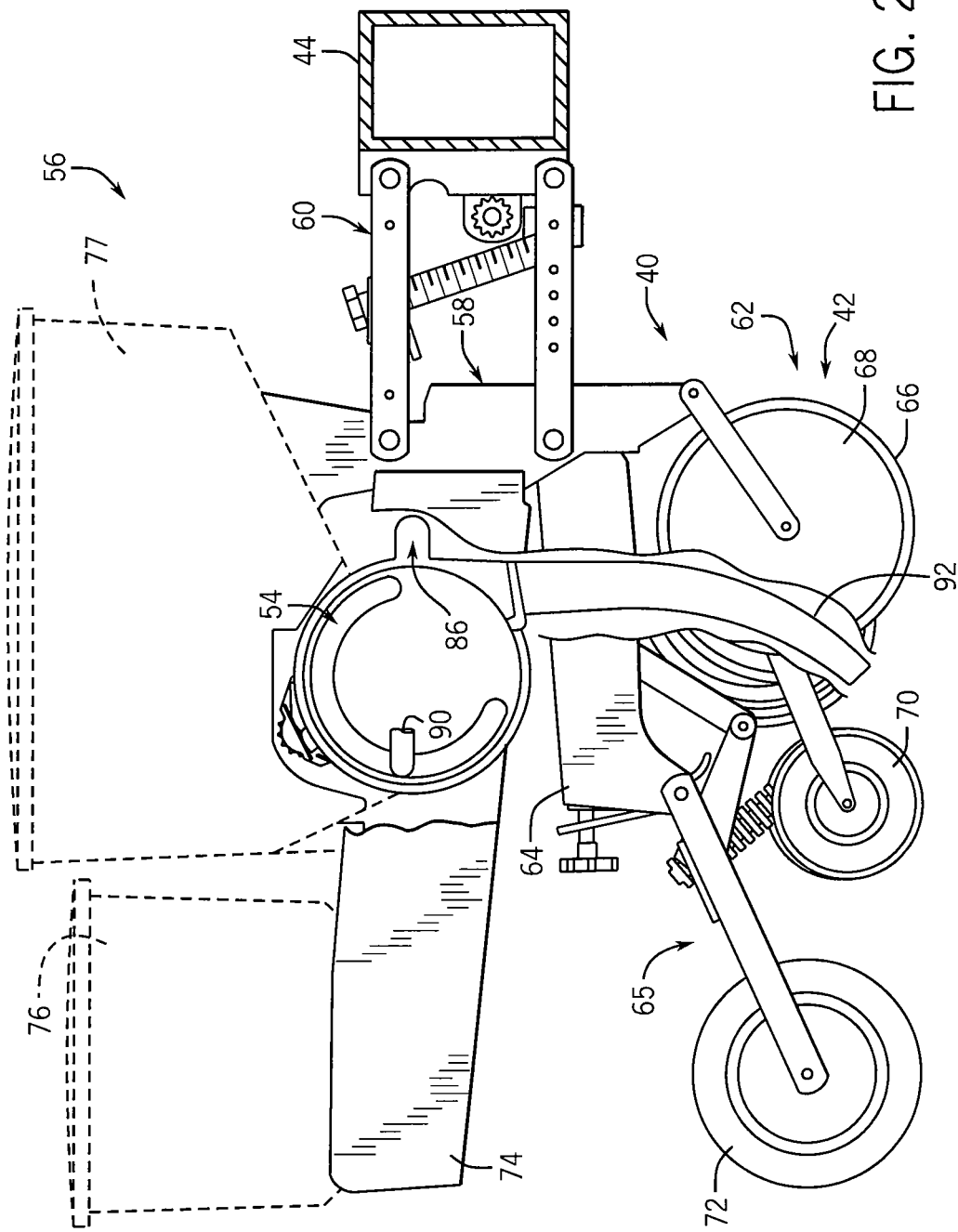
FIG. 2 illustrates a side elevation view of a planter row unit with a seed meter of in FIG. 1.

Referring now to FIG. 2, in this embodiment, a ground-engaging tool 40 and a seed meter 54 are shown as defining a planter row unit 56. Each planter row unit 56 includes a sub-frame 58 that is connected to the tool bar 44 by way of a parallel linkage system 60. A lower portion of the sub-frame 58 supports a furrow-opening mechanism 62 defining the opener 42 in this embodiment and a rearwardly extending bracket or backbone 64 upon which a furrow-closing mechanism 65 is arranged behind the furrow-opening mechanism 62. The furrow-opening mechanism 62 includes an opener disk(s) 66 as a ground-engaging tool 40 that penetrates the soil and creates a furrow and gauge wheel 68 that has a limited displacement relative to the opener disk(s) 66. This allows the depth of the furrow to be selected by an operator by adjusting the amount of permitted movement of the gauge wheel 68 so as to control the depth to which the opener disk(s) 66 can penetrate the soil. The furrow-closing mechanism 64 includes a closing disk(s) 70 as a ground-engaging tool 40 that closes the furrow after the planter row unit 56 deposits seeds into the furrow and a press wheel 72 that rolls over the closed furrow to firm the soil over the seed to further close the furrow and promote favorable seed-to-soil contact. The sub-frame 58 includes a shelf 74 that is arranged above and generally parallel to the backbone 64.

Shelf 74 may support an optional pesticide hopper 76 that contains, e.g., an herbicide or an insecticide, along with a known pesticide-dispensing system (not shown) for applying controlled amounts of the contents in the desired location(s) while using the system 5. Shelf 74 may also support a seed hopper 77 for direct storage of seed planter row unit 56 instead of the remote bulk storage in the bulk seed storage container 20 (FIG. 1).

Figure 3:
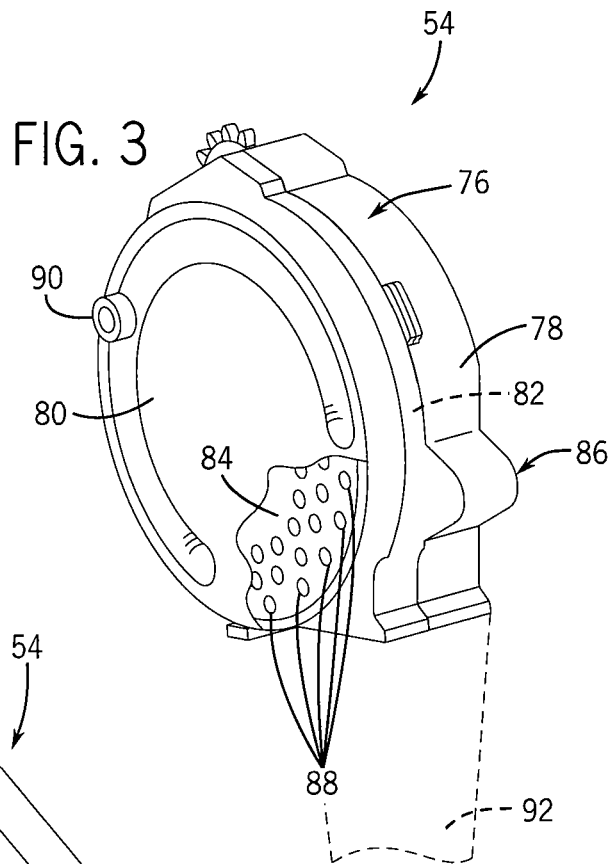
FIG. 3 illustrates a pictorial view of the seed meter of FIG. 2.
Figure 4:
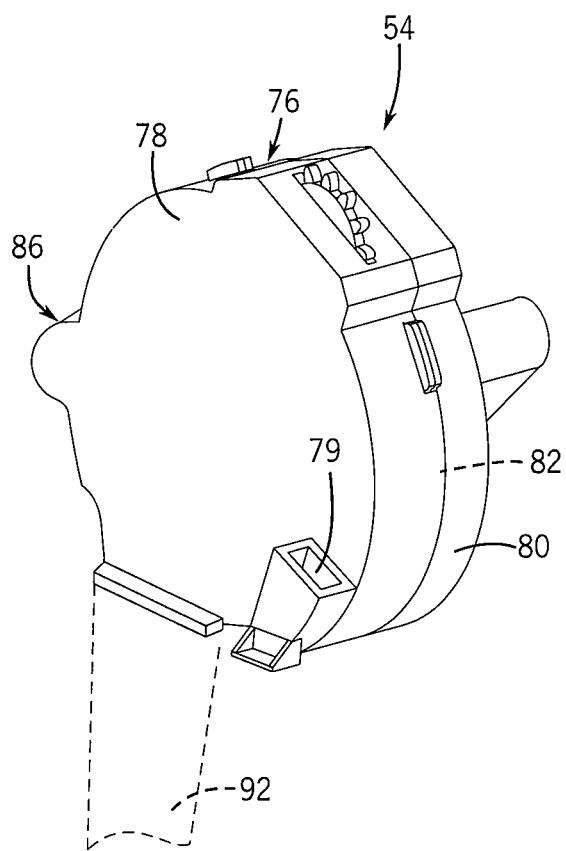
FIG. 4 illustrates another a pictorial view of the seed meter of FIG. 2.

Referring now to FIGS. 3 and 4, the seed meter 54 of this embodiment is shown as being a pneumatic seed meter that uses pneumatic pressure from fan 50 for various operations. In another embodiment, the seed meter 54 may be a purely mechanical-type seed meter. The illustrated seed meter 54 includes a multi-component housing 76 that supports the entire seed meter 54 and its components and temporarily holds the seed that is being metered. The housing 76 includes a meter cover 78 and a seed disk cover 80 that engage each other at respective outer peripheries so as to define a cavity 82 inside of the housing 76. A seed opening 79 (FIG. 4) extends into the meter cover 78 and provides an entry through which the seeds enter the seed meter 54 so that the seeds can be held in an area of the meter housing cavity 82 that is confined by a divider wall (not shown) and a seed disk 84 (FIG. 3) that is rotatably arranged in the housing cavity 82. As shown in FIG. 4, a drive assembly 86 is mounted to the seed meter 54 for driving the rotating components of the seed meter 54.

Referring now to FIG. 3, as is known, seed disk 84 includes seed pockets 88 that are discrete openings that include holes that extend between front and back surfaces and thus through the entire thickness of the seed disk 84. The seed pockets 88 are spaced from each other and, in this embodiment, are arranged in a pattern of multiple concentric circles so that the seed pockets 88 occupy a relatively large percentage of the surface area of the seed disk 84. A vacuum inlet 90 and vacuum supply hose (not shown) connect the seed meter 54 to the fan 50 (FIG. 1). The vacuum inlet 90 is arranged on the seed disk cover 80 for creating a vacuum pressure within a portion of the cavity 82 for holding seeds within the seed pockets 88 of the seed disk 84 while the seeds travel through the seed meter 54. A seed tube 92 is arranged downstream of a cutoff location within the seed meter 54 through which the seed pockets 88 pass for releasing each seed from a respective seed pocket 88, through an outlet of the seed meter 54 and into the seed tube 92. The seed tube 92 extends from the outlet of the seed meter 54 and is arranged for delivering the singulated, individual seeds into the furrow of the agricultural field.

Figure 5:
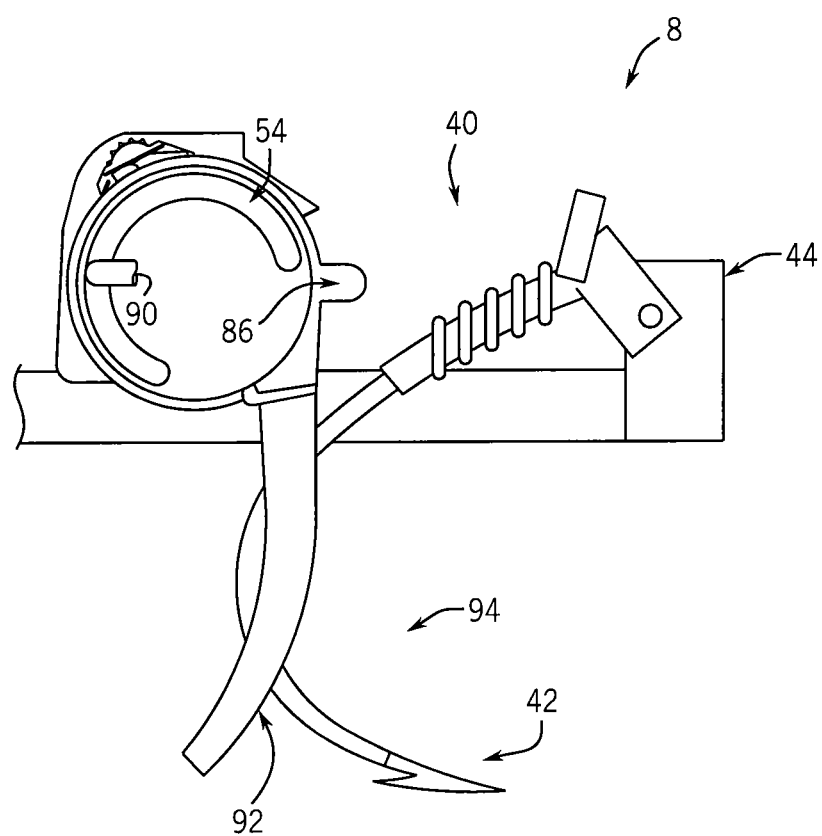
FIG. 5 illustrates a side elevation view of a seed meter arranged with a shank-style opener as a ground engaging tool.

Referring now to FIG. 5, the seed meter 54 is mostly identical to that of FIGS. 2-4, whereby such descriptions are applicable here with respect to the seed meter 54 of FIG. 5. However, unlike the seed meter 54 of FIG. 2 that is arranged upon a planter row unit 56, the seed meter 54 of FIG. 5 is supported by the toolbar 44 and shown with a single ground-engaging unit 40. The ground-engaging unit 40 of this embodiment is a shank-style opener 94 defining the opener 42 and supported by the toolbar 44.

Many changes and modifications could be made to the invention without departing from the spirit thereof. The scope of these changes will become apparent from the appended claims.

We claim:
1. A singulation seeding system, comprising:
    a drill towable behind a tractor and defining a first rank arranged relatively closer to the tractor and a second rank arranged relatively further from the tractor;
    a bulk storage system towable behind the tractor and storing a first fertilizer, a second, starter fertilizer and seed for delivery to the agricultural field;
    a ground-engaging tool supported by the first and second ranks of the drill and arranged to contact the agricultural field, the ground-engaging tool including a first opener arranged at the first rank to open a first furrow in the agricultural field and a second opener arranged at the second rank to open a second furrow in the agricultural field;
    a first fertilizer delivery tube receiving the first fertilizer from the bulk storage system and arranged with respect to the first opener of the ground-engaging tool for delivering the first fertilizer to the first furrow in the agricultural field;
    a seed meter supported by the second rank of the drill rearwardly of the first fertilizer delivery tube, the seed meter receiving the seed from the bulk storage system for singulating and individually delivering the seed to the second furrow in the agricultural field; and
    a second fertilizer delivery tube receiving the second fertilizer from the bulk storage system and arranged with respect to the second opener of the ground-engaging tool for delivering the second fertilizer to the second furrow in the agricultural field.

2. The singulation seeding system of claim 1 wherein the bulk storage system includes a seed storage container for bulk storage of seed that is supported by the drill, a first fertilizer storage container storing the first a fertilizer and supported by the drill for delivery to the agricultural field at a first delivery rate, and a second fertilizer storage container towable by the tractor separate from the drill and storing a the second fertilizer for delivery to the agricultural field at a second delivery rate that is less than the first delivery rate.

3. The singulation seeding system of claim 2 wherein the second fertilizer is a starter fertilizer which is delivered at the second rank of the drill.

4. The singulation seeding system of claim 1 wherein the bulk storage system includes a first bulk storage container storing the second fertilizer and a seed storage container storing the seed.

5. The singulation seeding system of claim 4 wherein at least one of the bulk storage and the seed storage containers is arranged upon the drill.

6. The singulation seeding system of claim 4 further comprising a second bulk storage container arranged upon an air cart towable behind the tractor.

7. The singulation seeding system of claim 6 wherein the air cart is arranged behind the drill.

8. The singulation seeding system of claim 6 wherein the second bulk storage container stores the first fertilizer for delivery at a relatively higher delivery rate and wherein the first bulk storage container arranged upon the drill and storing the second fertilizer for delivery at a relatively lower delivery rate.

9. The singulation seeding system of claim 1 wherein the seed meter includes a seed disk for conveying individual seeds through the seed meter for individual delivery to the agricultural field.

10. The singulation seeding system of claim 9 wherein the seed meter is arranged at the second rank of the drill.

11. The singulation seeding system of claim 9 further comprising a seed delivery tube receiving seeds from the seed meter and delivering the individual seeds to the agricultural field, the seed delivery tube arranged with respect to the second opener of the ground-engaging tool to deliver the seed to the second furrow at a location that is transversely spaced from the first furrow.

12. A singulation seeding system, comprising:
a drill towable behind a tractor and defining a first rank arranged relatively closer to the tractor and a second rank arranged relatively further from the tractor;
a bulk storage system towable behind the tractor and including a seed storage container for hulk storage of seed that is supported by the drill, a first fertilizer storage container storing a starter fertilizer and supported by the drill for delivery to the agricultural field at a first delivery rate, and a second fertilizer storage container towable by the tractor separate from the drill and storing a second fertilizer for delivery to the agricultural field at a second delivery rate that is higher than the first delivery rate;
multiple ground-engaging tools supported by the first and second ranks of the drill and arranged to contact the agricultural field, each of the multiple ground-engaging tools including a first opener arranged at the first rank to open a corresponding first furrow in the agricultural field and a second opener arranged at the second rank to open a corresponding second furrow in the agricultural field;
multiple second fertilizer delivery tubes arranged to deliver the second fertilizer to the first furrows;
multiple seed meters arranged on the second rank of the drill, each seed meter receiving seed from the seed storage container and singulating the seeds for individual delivery onto the corresponding second furrow of the agricultural field through a seed tube; and
multiple starter fertilizer delivery tubes arranged to deliver the starter fertilizer into corresponding second furrows adjacent respective seed tubes.

13. The singulation seeding system of claim 12 wherein the starter fertilizer and the second fertilizer are delivered from different segments of the drill.

* * * * *